…

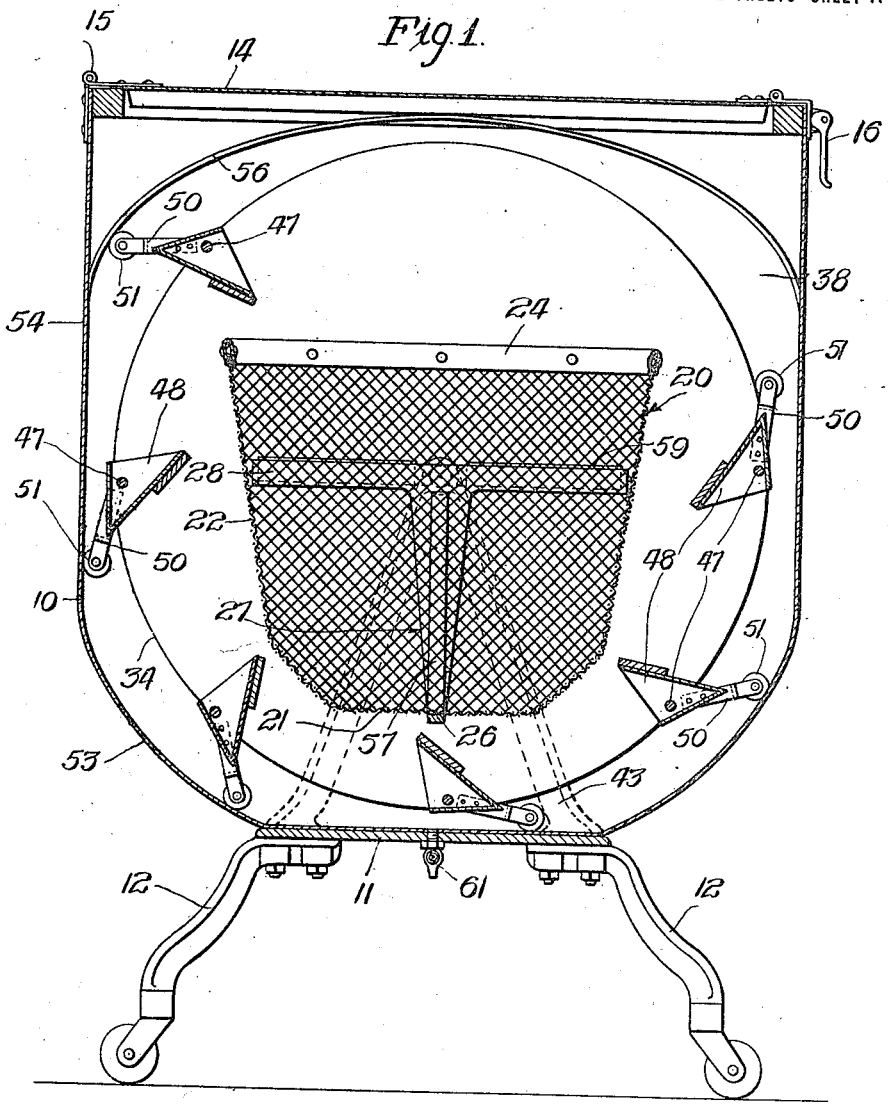

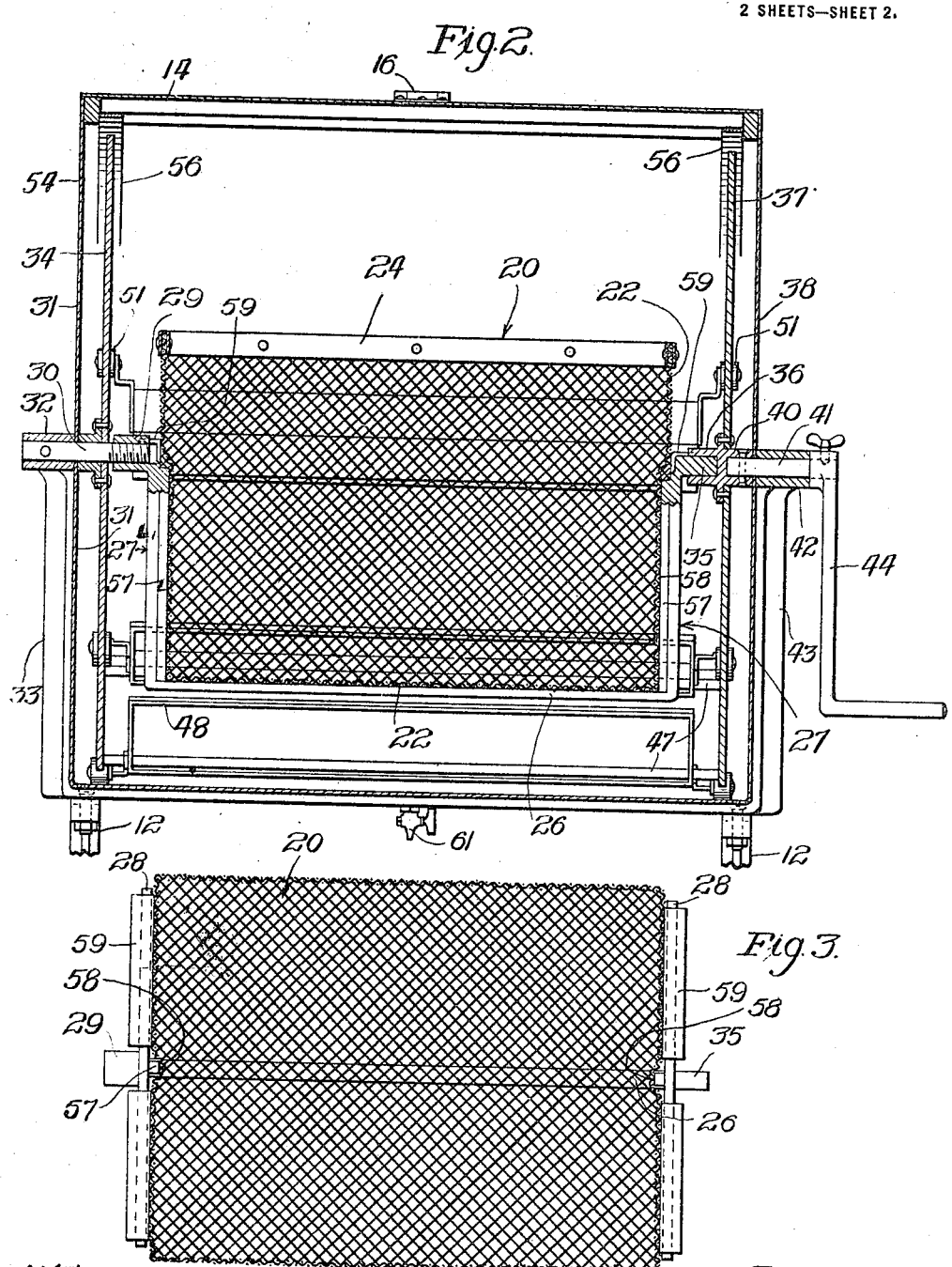

UNITED STATES PATENT OFFICE.

JOHN THOMAS McGRATH, OF BLOOMINGTON, ILLINOIS.

DISH-WASHING MACHINE.

1,143,216.  Specification of Letters Patent.  Patented June 15, 1915.

Application filed June 19, 1914. Serial No. 846,084.

*To all whom it may concern:*

Be it known that I, JOHN THOMAS MC-GRATH, a citizen of the United States, and a resident of Bloomington, in the county of McLean and State of Illinois, have invented certain new and useful Improvements in Dish-Washing Machines; and I do hereby declare that the following is a full, clear, and exact description thereof, reference being had to the accompanying drawings, and to the characters of reference marked thereon, which form a part of this specification.

This invention relates to improvements in dish washing machines of that kind embracing a closed casing or tub to receive and hold the wash water, a skeleton or reticulated basket to receive and hold the dishes or other articles to be washed and means for carrying the wash water upwardly from the body of water in the casing and for discharging it into the open-topped basket upon the dishes therein, the water passing downwardly among the dishes and through the perforated basket wall to the body of water below.

Among the objects of the invention is to provide novel means for carrying the wash water to and discharging it upon the dishes in the receptacle or basket.

A further object of the invention is to provide novel means for supporting the dish holding basket or receptacle in the washer casing, so arranged as to hold it fixedly in place and to permit the ready removal thereof.

A further object of the invention is to provide an improved supporting bearing between the basket holding frame and the casing walls which is associated with the bearing support for the rotating water carrying buckets in such manner as to permit the buckets to be rotated by simple and readily applied means located exteriorly to the casing, and to provide reliable bearing for the series of rotating buckets.

Other objects of the invention are to simplify and improve washing machines of this general character, and the invention consists in the matters hereinafter set forth and more particularly pointed out in the appended claims.

In the drawings:—Figure 1 is a transverse vertical sectional view of a dish washing machine embodying my invention. Fig. 2 is a vertical section thereof, in the axis of rotation of the series of buckets. Fig. 3 is a plan view of the dish basket and its supporting frame, with the top binding frame of the basket omitted.

As shown in the drawings, 10 designates the casing or tub of the machine which is supported on a frame 11 provided with legs or standards 12, 12, the latter preferably provided with supporting casters. The top wall 14 of the casing is hinged at 15 to constitute a swinging lid or cover, and said cover is adapted to be locked closed by means of an eccentric locking latch 16, as shown in Fig. 1, or other suitable locking device.

Arranged within the casing is a fixed dish receiving basket 20. It is open at its top and comprises a perforated bottom wall 21 and reticulated surrounding walls 22 conveniently made of wire netting. The edges of the reticulated walls may be strengthened at the open top of the basket by means of a binding strip 24. The said basket is supported by a frame member which comprises a horizontal saddle bar 26 and upright end members 27, which latter are provided at their upper ends with laterally and oppositely extending arms 28. The upright member 27 is provided at the rear end of the machine with an interiorly screw-threaded boss 29 which receives a stud 30 screw-threaded thereto, and said stud extends outwardly through the end wall 31 of the casing 10. The stud is mounted in a bearing 32 formed on the upper end of a standard 33 which rises from the machine frame 11 exterior to said casing wall 31. The said stud extends axially through and constitutes a bearing for a rotative disk 34 which constitutes a portion of a rotative bucket carrying frame, hereinafter to be described. The upright frame member 27 at the front end of the machine is provided at its upper end with a stud 35 which extends into and is supported by the inner end of a bearing sleeve 36 which extends axially through and is attached to a rotating disk 37 arranged adjacent to the front wall 38 of the casing and parallel to its companion disk 34 at the opposite end of the casing. Said sleeve 36 extends outwardly beyond the disk to the adjacent end wall of the casing, as shown at 40, to receive a crank stud 41 which is rotatively mounted on a bearing 42 carried by the upper end of a standard 43 arranged exteriorly to the casing and supported by the under frame of the machine. A crank 44 is attached to the outer end of the crank stud by which to rotate it. The said disks 34, 37 are connected together to constitute a rotative bucket supporting frame by means of a circular series of rods 47 which extend between and are attached in any suitable manner at their ends to the disks near the peripheries of the latter. Said rods pivotally support buckets 48 which also extend between the disks 34, 37 and are of a length at least as great as the basket 20. The bucket supporting rods are located at such distance radially exterior to the dish holding basket that the buckets 48 carried thereby clear all parts of the basket in the rotation of the series of buckets. The water raising buckets are partially submerged in the wash water and the buckets, as they pass through the body of water, are filled as they rise on the rising side of the rotative water carrier and carry their contents upwardly and dump the same into the top of the basket when the buckets reach the upper part of their path of rotation.

The said buckets are held in position to maintain them upright as they are passing upwardly out of the water so as to thereby carry a full load of water to the top of the basket, and by means which permit the buckets to tilt when they reach a plane above the top of the basket, so as to throw all of the water carried thereby at once upon the dishes in the basket. Thereby is secured a more thorough cleansing action of the water on the dishes than if the water were allowed to escape slowly from the buckets. The means herein shown for so controlling the buckets are made as follows: Each bucket is provided at each end thereof with an arm 50 fixed rigidly to the bucket, and each arm is provided at its outer end with a roller 51. The said rollers 51 have broad bearing faces and travel throughout a portion of the rotation of the buckets in contact with the inner sides of the casing walls so as to thereby hold the buckets in prescribed positions. The casing which is rectangular in horizontal section at its top is rounded at its bottom, and the curvature of the lower side of the casing is generally concentric to the axis of rotation of the series of water lifting buckets. Accurate curvature of the lower part of the casing for engagement of said bearing rollers is not essential, but it is desirable that the curvature of that portion 53 of the wall at the rising side of the series of buckets be such, relatively to the axis of rotation of said buckets, as to maintain the buckets in upright position so as to carry full loads of water upwardly. As each bucket reaches a height above the level of the plane of the top of the basket its pivotal support 47 moves away from the adjacent straight portion 54 of the side wall and thereby carries the roller 51 away from the wall. The weight of the bucket and its contents act at this time to suddenly tip the bucket and to throw the water into the pile of dishes in the basket with considerable force. As the buckets pass onto the descending side of their path of rotation, the bearing rollers 51 again engage the casing wall and are, by traveling contact with said wall, controlled to maintain the same in position for filling before again passing upwardly.

In order that the buckets may pass smoothly, in the uppermost arc of their rotation from the straight portion 54 of one side wall to the opposite side wall, I may provide the end walls of the casing with curved guide tracks 56 arranged in position to be engaged by the bearing rollers 51 after the rollers leave the straight portion 54 of the side wall to permit the buckets to dump their contents into the basket, and so balance the buckets as to cause the rollers to be held in contact with said guides during the passage of the buckets from one side of the casing to the other. The same results may be secured by weighting the arms 50 so that the rollers 51 will be supported by the peripheries of the disks 34, 37 when the buckets are passing through the upper arc of their movement from one side of the casing to the other.

The basket 20 rests on the saddle member 26 of the basket supporting frame. It is supported against canting sidewise by means of vertical ribs 57 on the end members 27 of the basket supporting frame which fit in vertical grooves 58 formed in the end walls of the basket, said grooves extending entirely to the bottom of the basket. As a further means of supporting and steadying the basket, I may provide the end walls with flanged bars 59 adapted to rest upon the lateral arms 28 of the end upright members 27 of the basket supporting frame.

The basket supporting means shown have been designed with a view to facilitate the removal of the basket 20 from the casing, it being obvious that the basket may be freely lifted upwardly away from said frame. In order to further facilitate the removal of the basket it is preferable that the series of buckets be not entirely complete, there being a number of buckets omitted from the series to provide a space wide enough at the top of the water lifting mechanism, when the latter is properly adjusted, to permit the passage of the basket between the terminal buckets of the series.

In the use of the apparatus, the casing 10 is filled with hot water (charged with soap, if desired,) to a level to practically submerge the lower buckets of the series, the dishes or other articles to be cleansed are placed in the basket, and thereafter the water lifting mechanism is rotated through the medium of the hand crank 44. The buckets will be spaced at such distance apart and the device rotated at such speed that the water will be dashed in rapid succession from the buckets onto the dishes in the basket, with considerable force, the water returning among the dishes to the bottom of the casing to be used over again. In this way the dishes are rapidly cleansed. The water is drained from the casing through a valved outlet 61.

It will be understood that the detailed description of the illustrated embodiment of the invention is not intended to limit the invention to the specific details shown, except as said details are hereinafter made the subject of specific claims, and as imposed by the prior art.

I claim as my invention:—

1. In a dish washing machine, the combination with a receptacle, a dish basket therein, a circular series of tiltable buckets rotatable about the basket to carry the wash water to the basket, and means to control the tilting of the buckets comprising a fixed guide on the receptacle and projections on the buckets which travel on said guide.

2. A dish washing machine comprising a receptacle for the wash water, a dish basket therein, a circular series of buckets, a rotative support for said buckets to carry them around the basket, and controlling means for said buckets constructed to tilt the buckets relatively to said rotative support to dump the wash water therefrom into the basket near the upper part of the arc of movement of the buckets.

3. A dish washing machine comprising a receptacle for the wash water, an open-topped dish basket therein, a circular series of buckets mounted in the casing to rotate through the wash water to carry the wash water to and discharge it into the open-topped basket, pivots upon which the buckets are tiltingly mounted, means whereby said series of buckets are rotated and means at the upper arc of the rising side of the path of the buckets embracing fixed parts on the receptacle and coacting parts on the buckets to control the tilting movement of said buckets constructed to permit them to tilt to dump the contents thereof into the open top of the basket.

4. A dish washing machine comprising a casing for the wash water, a dish receptacle therein, an annular series of tiltingly supported buckets mounted in the casing to rotate around the basket to carry the wash water to and discharge it into the basket, means to rotate said series and means on the buckets coöperating with guiding surfaces on the casing to hold the buckets upright as they rise through the wash water and constructed to permit the buckets to dump their contents into the basket when passing through the upper arc of their travel.

5. A dish washing machine comprising a casing for wash water, a dish receptacle therein, an annular series of tiltingly supported buckets mounted in the casing to rotate around the basket to carry wash water to and discharge it into the basket, means to rotate said series of buckets, said casing having a straight upper side wall and a curved lower wall, and rollers carried by the buckets and traveling along said walls to control filling positions and tilting movements of said buckets.

6. A dish washing machine comprising a casing for wash water, a dish receptacle therein, an annular series of tiltingly supported buckets mounted in the casing to rotate around the basket to carry wash water to and discharge it into the basket, means to rotate said series of buckets, said casing having a straight side wall and a lower curved wall, rollers carried by the buckets and traveling along the said walls to control the filling positions and tilting movements of said buckets, and means to control the position of the buckets in their passage over the basket from one side to the other of the casing.

7. A dish washing machine comprising a casing to contain wash water, a dish basket therein, disks rotatively mounted in the casing at the ends of said basket, rods extending between and attached to said disks, water carrying buckets pivotally supported on said rods, and means to tilt the buckets relatively to said disks while the buckets are passing through their upper arc of movement at the rising side of said arc.

8. A dish washing machine comprising a casing to contain wash water, an open-topped, reticulated dish basket therein, disks rotatively mounted in the casing at the ends of the basket, rods extending between and attached to said disks, water carrying buckets pivotally supported on said rods, and means to control the filling positions and tilting movements of said buckets comprising fixed guides on the casing and members on the buckets which travel thereover.

9. A dish washing machine comprising a casing to contain wash water and provided with guiding surfaces, an open-topped, reticulated dish basket therein, disks rotatively mounted in the casing at the ends of said basket, rods extending between and attached to said disks, water carrying buckets pivotally supported on said rods, and rollers carried by said buckets and traveling along said guiding surfaces of the casing, for the purpose set forth.

10. In a dish washing machine, the combination with a casing having a movable cover, a dish basket therein, means to lift the wash water and to discharge it into said basket and a T-shaped supporting frame within said casing for said basket comprising a horizontal saddle bar on which the basket rests and upright end members at each end of and interlocked to the end walls of the basket constructed to permit the basket to be removed vertically from said casing relatively to said supporting frame.

11. In a dish washing machine, the combination with a casing having a movable cover, a dish basket therein, means to lift the wash water and to discharge it into said basket and a supporting frame for said basket supported on the machine frame comprising a horizontal bar on which the basket rests and upright members, at the ends of the basket, the end walls of the basket being provided with vertical grooves extending to the bottoms thereof and ribs on the upright members to engage said grooves.

12. In a dish washing machine, the combination with a casing having a movable cover, a dish basket therein, means to lift the wash water and discharge it into the basket and a supporting frame for the said basket supported on the machine frame comprising a saddle bar on which the basket rests, upright end members at the ends of the basket provided at their upper ends with horizontal arms, and rails fixed to the basket and supported on said arms.

13. In a dish washing machine, the combination with a casing having a movable cover, a dish basket therein, a supporting frame for the basket having end bearings which are supported on the machine frame, and a water lifting mechanism to carry water to said basket comprising disks rotatively mounted on said end bearings, a circular series of buckets extending between and carried by said disks and arranged to travel in a path which surrounds said basket, with means to rotate said water lifting mechanism, and means to tilt the buckets relatively to the disks at the rising side of their circular path of movement.

14. In a dish washing machine, the combination with a casing having a movable cover, a dish basket therein, a supporting frame for the basket having end bearings which are supported on the machine frame, and a water lifting mechanism to carry water to said basket comprising disks rotatively mounted on said end bearings, a circular series of rods extending between and attached to said disks, and buckets tiltingly supported on said rods, with controlling means therefor to tilt the buckets relatively to the disks at the rising side of their path of movement, and means to rotate said mechanism.

In testimony, that I claim the foregoing as my invention I affix my signature in the presence of two witnesses, this 1st day of June A. D. 1914.

JOHN THOMAS McGRATH.

Witnesses:
T. J. BANK,
N. McDERMOTT.